(12) United States Patent
Osotio et al.

(10) Patent No.: US 10,963,774 B2
(45) Date of Patent: Mar. 30, 2021

(54) SYSTEMS AND METHODS FOR ARTIFICIAL INTELLIGENCE INTERFACE GENERATION, EVOLUTION, AND/OR ADJUSTMENT

(71) Applicant: Microsoft Technology Licensing, LLC, Redmond, WA (US)

(72) Inventors: Neal Osotio, Sammamish, WA (US); Emma Williams, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 808 days.

(21) Appl. No.: 15/401,557

(22) Filed: Jan. 9, 2017

(65) Prior Publication Data

US 2018/0197066 A1    Jul. 12, 2018

(51) Int. Cl.
*G06N 3/00*   (2006.01)
*G06N 5/02*   (2006.01)
*G06F 3/01*   (2006.01)

(52) U.S. Cl.
CPC ............ *G06N 3/004* (2013.01); *G06N 3/006* (2013.01); *G06N 5/022* (2013.01); *G06F 3/015* (2013.01)

(58) Field of Classification Search
CPC ........ G06N 3/004; G06N 5/022; G06N 3/006; G06F 3/015
See application file for complete search history.

(56) References Cited

U.S. PATENT DOCUMENTS

| | | | |
|---|---|---|---|
| 5,807,114 A | 9/1998 | Hodges et al. | |
| 6,057,846 A | 5/2000 | Sever | |
| 6,186,145 B1 | 2/2001 | Brown | |
| 6,425,764 B1 | 7/2002 | Lamson | |
| 7,908,554 B1 | 3/2011 | Blattner | |
| 8,217,945 B1* | 7/2012 | Moscovici | G06Q 50/01 345/440 |
| 8,292,797 B2 | 10/2012 | Chapman et al. | |
| 8,620,850 B2* | 12/2013 | Brown | G06F 40/30 706/52 |
| 8,996,429 B1* | 3/2015 | Francis, Jr. | G06N 3/008 706/12 |
| 9,030,495 B2 | 5/2015 | McCulloch et al. | |
| 9,870,636 B2* | 1/2018 | Tarquini | G06T 13/40 |
| 9,959,497 B1* | 5/2018 | Ivanov | G06N 3/006 |
| 2005/0004437 A1 | 1/2005 | Kaufmann et al. | |

(Continued)

OTHER PUBLICATIONS

Taffou, Marine, "Inducing feelings of fear with virtual reality : the influence of multisensory stimulation on negative emotional experience", In Doctoral dissertation of Universite Pierre et Marie Curie-Paris, Dec. 17, 2014, 195 pages.

(Continued)

*Primary Examiner* — Kamran Afshar
*Assistant Examiner* — Imad Kassim

(57) ABSTRACT

Systems and methods for generating, adjusting and/or evolving a visual personification of an AI interface for an AI application are provided. More specifically, the visual personification of the AI interface is generated, adjusted, and/or evolved based on one or more user inputs and/or the evaluation of other known user data. Accordingly, the generated, adjusted and/or evolved visual personification of an AI interface based on the user increases engagement, trust, and/or emotional connection with the user without requiring any AI interface setting changes by the user.

19 Claims, 11 Drawing Sheets

(56) References Cited

U.S. PATENT DOCUMENTS

| | | | |
|---|---|---|---|
| 2005/0054381 A1* | 3/2005 | Lee | H04M 1/72586 |
| | | | 455/557 |
| 2005/0118996 A1* | 6/2005 | Lee | G06F 3/011 |
| | | | 455/425 |
| 2006/0224046 A1 | 10/2006 | Ramadas et al. | |
| 2007/0074114 A1 | 3/2007 | Adjali et al. | |
| 2009/0144173 A1 | 6/2009 | Mo et al. | |
| 2009/0164132 A1* | 6/2009 | Jung | G16B 45/00 |
| | | | 702/19 |
| 2011/0007142 A1 | 1/2011 | Perez et al. | |
| 2012/0329432 A1 | 12/2012 | Gupta et al. | |
| 2013/0083062 A1 | 4/2013 | Geisner et al. | |
| 2014/0157153 A1 | 6/2014 | Yuen et al. | |
| 2014/0354534 A1 | 12/2014 | Mullins | |
| 2015/0143487 A1* | 5/2015 | Nathan | H04L 63/08 |
| | | | 726/6 |
| 2015/0174362 A1 | 6/2015 | Panova et al. | |
| 2016/0019434 A1* | 1/2016 | Caldwell | G06K 9/4671 |
| | | | 345/474 |
| 2016/0086500 A1* | 3/2016 | Kaleal, III | G06T 19/00 |
| | | | 434/257 |
| 2017/0157482 A1* | 6/2017 | DeCarlo | A63B 69/00 |
| 2017/0206095 A1* | 7/2017 | Gibbs | G06F 3/167 |
| 2017/0206691 A1* | 7/2017 | Harrises | G06T 11/60 |
| 2018/0068482 A1* | 3/2018 | Yam | G06T 13/40 |

OTHER PUBLICATIONS

Khushalani, et al., "Flow Does Virtual Reality Enrich the Lives of Special Children?", http://mms.ecs.soton.ac.uk/2012/papers/18.pdf, Published on: 2010, 8 pages.

Lisetti, et al., "Developing Multimodal Intelligent Affective Interfaces for Tele-home Health Care", In International Journal of Human-Computer Studies, vol. 59, Issue 1-2, Jul. 1, 2003, pp. 245-245.

"International Search Report and Written Opinion Issued in PCT Application No. PCT/US2017/067152", dated Apr. 4, 2018, 15 Pages.

* cited by examiner

SYSTEMS AND METHODS FOR ARTIFICIAL INTELLIGENCE INTERFACE GENERATION, EVOLUTION, AND/OR ADJUSTMENT

BACKGROUND

Language understanding systems, personal digital assistants, agents and artificial intelligence are changing the way users interact with computers. Developers of computers, web services, and/or applications are always trying to improve the interactions between humans and computers. For example, developers may look for new ways to humanize different aspects of the interactions between humans and computers.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to systems and methods for generating, adjusting and/or evolving a visual representation of an artificial intelligence (AI) interface for an AI application. More specifically, the systems and methods disclosed herein generate, evolve and/or adjust a visual personification of the AI interface based on one or more user inputs and/or user data. Accordingly, the systems and methods as disclosed herein provide a visual personification of an AI interface based on the user to increase engagement, trust, and/or emotional connection with the user without requiring any AI interface setting changes by the user.

One aspect of the disclosure is directed to a system for an evolved visual representation of an artificial intelligence (AI) interface. The system includes at least one processor and a memory. The memory encodes computer executable instruction that, when executed by the at least one processor, are operative to:
 generate a first visual personification of an AI interface to compensate for one or more first characteristics of a user;
 receive first user signals from one or more devices associated with the user;
 evaluate the first user signals to determine at least one of a first context of the user and a first emotion of the user;
 determine if at least one of the first context or the first emotion meets an adjustment threshold;
 adjust the first visual personification of the AI interface in response to a determination that at least one of the first context and the first emotion meets the adjustment threshold to form an adjusted first visual personification of the AI interface;
 provide the adjusted first visual personification of the AI interface to the user for interacting with the user in response to formation of the adjusted first visual personification of the AI interface;
 compare compiled user contexts and compiled user emotions for the user to an evolution threshold;
 determine that the evolution threshold has been met based on the comparison;
 in response to the determination that the evolution threshold has been met, identify one or more second characteristics of the user based on the compiled user contexts and the compiled user emotions for the user; and
 in response to the determination that the evolution threshold has been met, generate a second visual personification of the AI interface by evolving the first visual personification of the AI interface to compensate for the one or more second characteristics of the user.
The AI interface is for an AI application.

In another aspect, a method for evolved visual representation of an artificial intelligence (AI) interface is disclosed. The method includes:
 generating a first visual personification of an AI interface;
 receiving user signals from one or more devices associated with a user of the AI application;
 evaluating the user signals to determine at least one of contexts of the user and emotions of the user;
 compiling the contexts and the emotions of the user to form compiled user contexts and compiled user emotions;
 comparing the compiled user contexts and the compiled user emotions to an evolution threshold;
 determining that the evolution threshold has been met; and
 in response to determining that the evolution threshold has been met, generating a second visual personification of the AI interface by evolving the first visual personification of the AI interface based on the compiled user contexts and the compiled user emotions.
The AI interface is for an AI application.

In yet another aspect of the invention, the disclosure is directed to a system for an evolved visual representation of an artificial intelligence (AI) interface. The system includes at least one processor and a memory. The memory encodes computer executable instruction that, when executed by the at least one processor, are operative to:
 generate a first visual personification of an AI interface based on collected user signals;
 receive current user signals from one or more devices associated with a user;
 evaluate the current user signals to determine at least one of a current context of the user and a current emotion of the user;
 determine that none of the current context, the current emotion, or the historical context meets an adjustment threshold;
 provide the first visual personification of the AI interface to the user for interacting with the user in response to a determination that none of the current context, the current emotion, or a historical context meet the adjustment threshold;
 compare compiled user contexts and compiled user emotions for the user to an evolution threshold;
 determine that the evolution threshold has been met; and
 in response to the determination that the evolution threshold has been met, generate a second visual personification of the AI interface by evolving the first visual personification of the AI interface based on at least one of the compiled user contexts and the compiled user emotions.
The AI interface is for an AI application.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
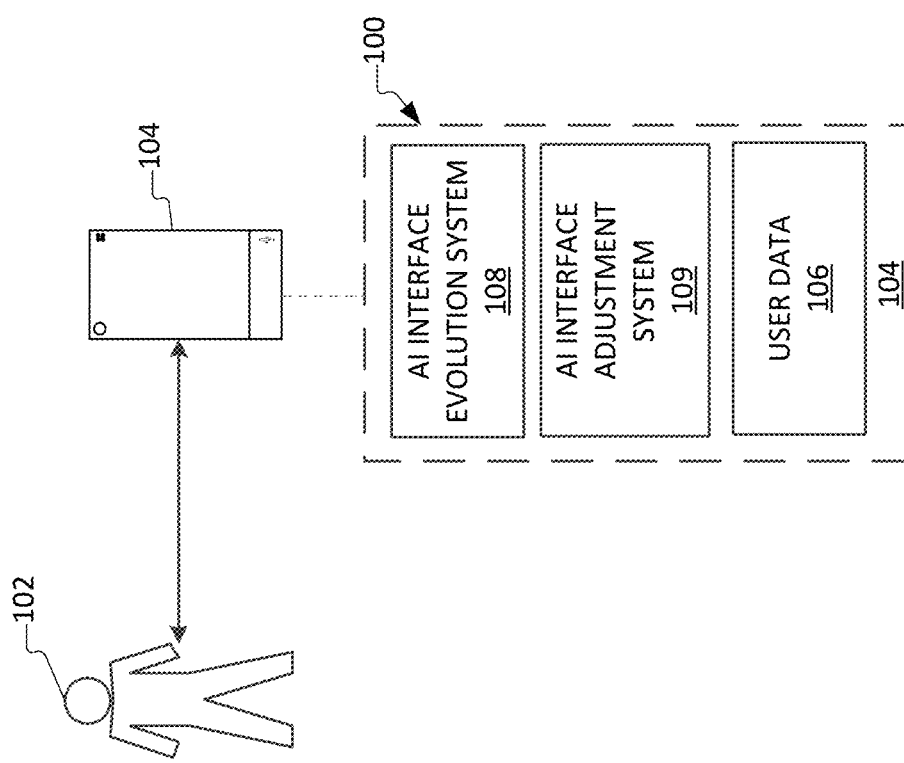
FIG. 1A is a schematic diagram illustrating a system for generating, adjusting and/or evolving a visual representation of an AI interface for an AI application, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Progress in machine learning, language understanding and artificial intelligence are changing the way users interact with computers. Digital assistant applications, such as Siri, Google Now, and Cortana are examples of the shift in human computer interaction.

Currently, the artificially intelligent (AI) interfaces utilized for such applications include using predetermined, created, or selected visual representations. For example, the user of an AI application may select from one or more predetermined visual personifications of the AI interface to interact with and to utilize the AI application. Alternatively, the user may create a visual personification from provided human features to form the visual personifications of the AI interface that the user interacts with to utilize the AI application. However, these systems and method do not allow the predetermined, selected, or created visual representation to be adjusted based on current user signals. Further, these systems and method do not allow the predetermined, selected, or created visual representation to evolve over time with the user based on a compiled user signals. Additionally, these systems and methods do not generate a visual representation for the AI interface that is based on the user signals and/or able to compensate for one or more characteristics of the user, such as a physical challenge faced by the user. As such, there is currently no system or method for generating, adjusting, or evolving a visual representation of an AI interface for an AI application based on user signals The systems and methods as disclosed herein are directed to generating, adjusting, and/or evolving a visual representation of an AI interface for an AI application based on collected user inputs and/or user data. The term "user signals" as utilized herein refer to user data and/or user inputs, such as location, digital activity, physical activity, heart rate, calendar, user preferences, voice input, pictures, glucose levels, etc. Further, the user signals may include user patterns that are determined based on the collected user data and/or user inputs. For example, user patterns, such as the user typically goes to bed around 10 pm and exercises every Tuesday and Thursday morning may be determined from the user data and/or user inputs and utilized as user signals. This list is exemplary and is not meant to be limiting. User signals may include any data or information about the user that can be collected or determined from the user client devices, the user's applications, sensors utilized by the user's client devices and/or apps, the user's digital activity, and enrichment of this obtained data or information with world knowledge. The sensors of the client computing device 104 may include heart rate sensors, EKG sensors, microphones, cameras, GPS sensors, thermometers, weight sensors, neural activity sensors, spatial sensors, movement sensors, etc. This list is exemplary and is not meant to be limiting. The client computing devices 104 may utilize any known sensors for monitoring the user.

The systems and methods as disclosed herein are directed to evolving a visual representation of an AI interface for an AI application based on compiled user inputs and/or data so the visual representation changes as the user of the AI application changes over time. Further, systems and methods as disclosed herein are directed to adjusting a visual representation of an AI interface based on collected current user data and/or inputs so the visual representation changes as the current mood, digital activity, physical activity, and environment of the user changes. More specifically, the systems and methods disclosed herein generate a visual representation for the AI interface based the collected user inputs and/or data. The generated visual representation may compensate for one or more characteristics of the user. For example, the systems and methods as disclosed herein evaluate the collected user inputs and/or data to determine user contexts, user emotions, and historical user contexts. Based on these determinations, the systems and methods as disclosed herein generate a personalized visual representation for the AI interface, adjust the generated personalized visual representation for the AI interface, and/or gradually evolve the generated personalized visual representation for the AI interface as the user changes over time. Accordingly, the systems and methods as disclosed herein provide an AI user interface for an AI application that is generated, adjusted, and/or evolves over time based on the user to increase engagement, trust, and/or emotional connection with the user without requiring any AI interface setting changes, inputs, or selections by the user when compared to previously utilized AI interfaces for AI applications.

Figure 1B:
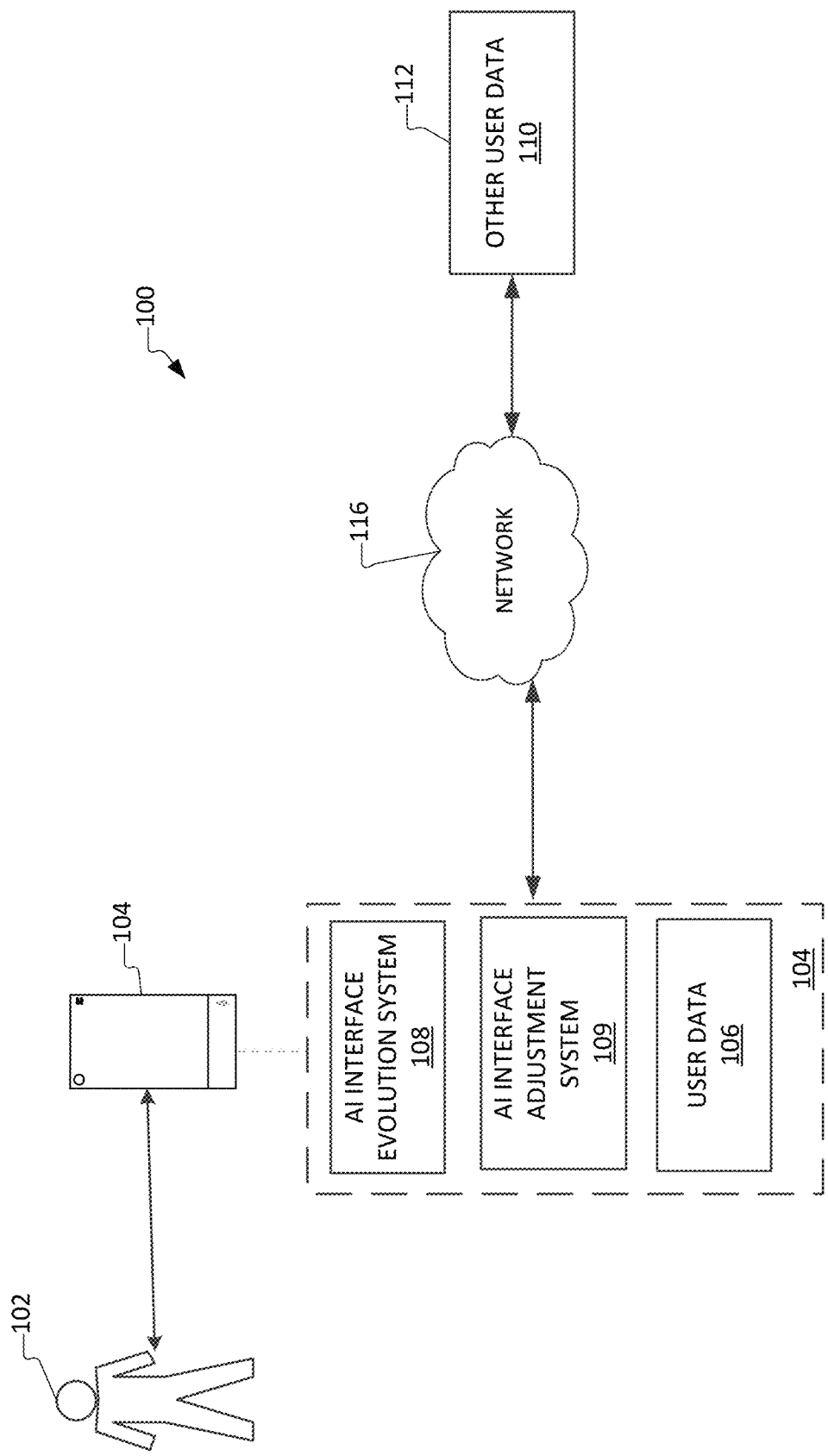
FIG. 1B is a schematic diagram illustrating a system for generating, adjusting and/or evolving a visual representation of an AI interface for an AI application, in accordance with aspects of the disclosure.
Figure 1C:
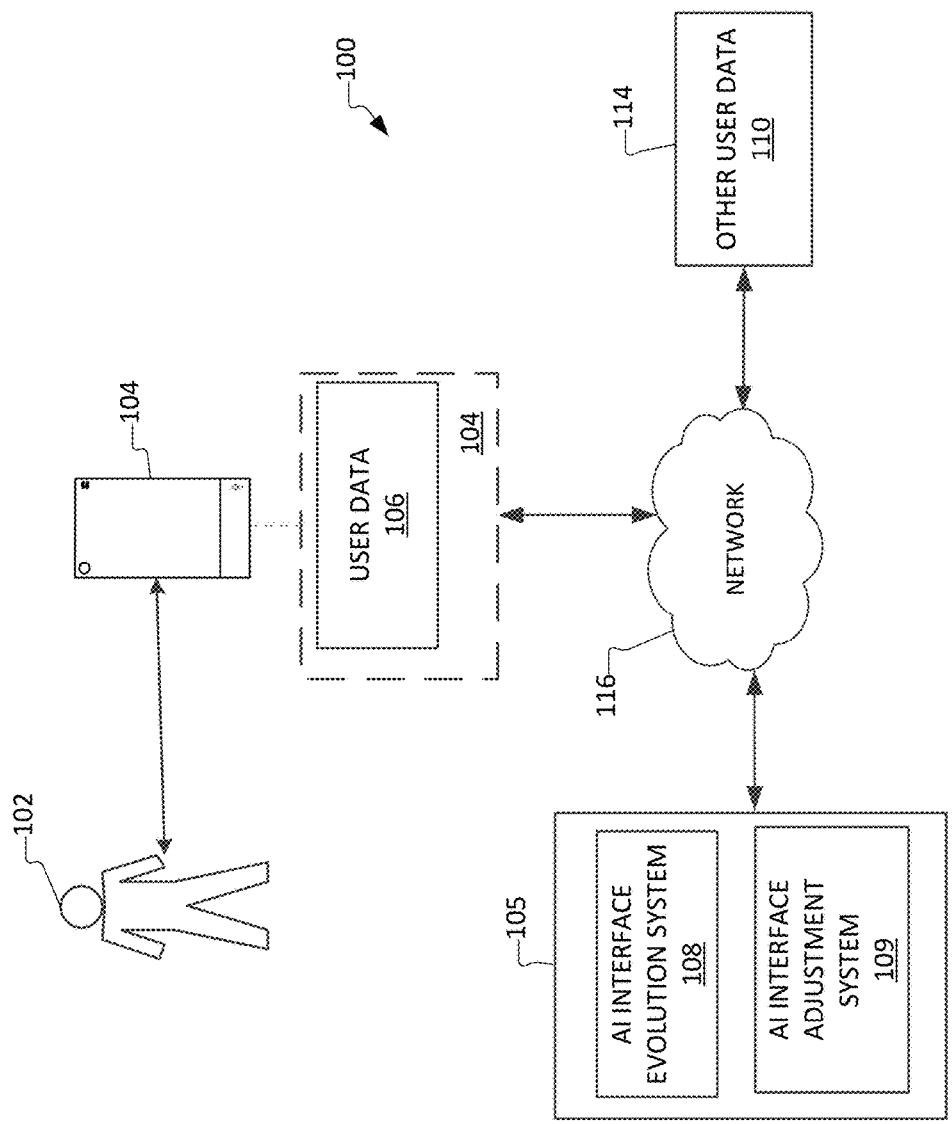
FIG. 1C is a schematic diagram illustrating a system for generating, adjusting and/or evolving a visual representation of an AI interface for an AI application, in accordance with aspects of the disclosure.
Figure 2:
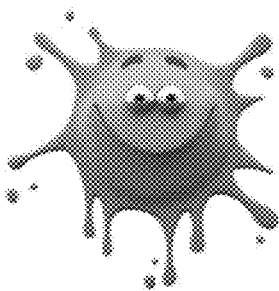
FIG. 2 is an image illustrating an example of a visual representation of an AI interface system for an AI application, in accordance with aspects of the disclosure.
Figure 3:
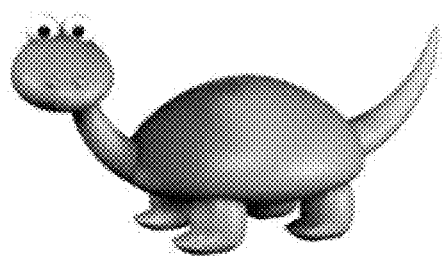
FIG. 3 is an image illustrating an example of a visual representation of an AI interface system for an AI application, in accordance with aspects of the disclosure.

FIGS. 1-3 illustrate different examples of an AI interface system 100 for an AI application being utilized by a user 102 via a client computing device 104, in accordance with aspects of the disclosure. The AI interface system 100 is any system that is capable of collecting user input and responding to collected user input for an AI application. The AI interface system 100 provides a personalized visual representation of an AI interface for an AI application that is generated, adjusted and/or evolved based on user signals. Further, the personalized visual representation may compensate for one or more characteristics of the user. As such, the AI interface system 100 includes an AI interface evolution system 108 and AI interface adjustment system 109.

In some aspects, the AI interface system 100 is implemented on the client computing device 104 as illustrated in FIGS. 1-2. In a basic configuration, the client computing device 104 is a computer having both input elements and output elements. The client computing device 104 is configured to receive spoken language input, text inputs, video inputs, image inputs, and other modal input from a user 102. In some aspects, the client computing device 104 receives the spoken language input via a sensor on the client computing device 104, such as a microphone. The client computing device 104 may be any suitable computing device for implementing the AI interface system 100. For example, the client computing device 104 may be a mobile telephone, a smart phone, a tablet, a phablet, a smart watch, a wearable computer, a personal computer, a gaming system, a desktop computer, a laptop computer, an augmented reality device, a virtual reality device, smart speakers, health monitoring computer, fitness tracker, HoloLens, and/or etc. This list is exemplary only and should not be considered as limiting. Any suitable client computing device 104 for implementing or communicating with the AI interface system 100 may be utilized. The AI interface system 100 allows a user 102 to interact with and utilize an AI application via spoken language input, text inputs, video inputs, image inputs, holograms, and any other known modal input from a user device 104. The AI interface system 100 collects user inputs and responds to the user inputs for the AI application.

In other aspects, the AI interface system 100 is implemented on a server computing device 105, as illustrated in FIG. 3. The server computing device 105 may provide data to and/or receive data from the client computing device 104 through a network 116. In some aspects, the network 116 is a distributed computing network, such as the internet. In further aspects, that AI interface system 100 is implemented on more than one server computing device 105, such as a plurality or network of server computing devices 105. In some aspects, the AI interface system 100 is a hybrid system with portions of the AI interface system 100 on the client computing device 104 and with portions of the AI interface system 100 on the server computing device 105.

The AI interface system 100 collects user input via the client computing device 104 for the AI application. The term "collect" as utilized herein refers to the active retrieval of information and/or the passive receipt or receiving of information. The user input may be spoken language/voice input and/or any other form of user input, such as text, gesture, touch, handwritten, clicks, selection, faction expressions, eye tracking, etc. The AI interface system 100 evaluates the user input and any other collected user data to determine a user context and/or a user emotion. As used herein, a user context is any information relating to the user that helps to fully understand the current state of the user. The user context is specific to and relates to a given user 102. The current state or user context is the current environment and current activity of the user 102 and/or client computing device 104. For example, the current state or user context may be based on the current location of the user, current time, current weather, current digital behavior of the user, current user physical actions, current user circumstances, current user ideas, current user conditions, current user factors, the current state of affairs of the user, etc. For example, if the user input requests a list of nearby funeral homes, the AI interface system 100 may be able to determine that context of the user is that the user is planning a funeral and that someone close to the user has passed away. As used herein, user emotion refers to the current emotional state of the user, such as happy, sad, angry, frustrated, excited, worried, etc. For example, based on the same user input above and voice characteristics of the spoken language input of above, the AI interface system 100 may be able to determine after evaluation that the user is sad and angry.

In some aspects, the AI interface evolution system 108 further evaluates other accessible user data or information in addition to the user input to determine user context and/or user emotion. The other accessible data is any data about the user that is accessible to the AI interface system 100. For example, accessible data may be user data 106 stored on the client computing device 104 or other user data 110 stored on a server 105, a knowledge backend 112, or on other client computing devices 114 of the user accessible to the AI interface system 100 via the network 116. The accessible data may include user contextual information, user environmental information, and/or user historical information. For example, accessible data may include user calendar information, provided background information, credit history, search history from utilized search engines, ethnicity, citizenship, user hobbies, user employment, social media information, friends, family, education, hometown, weight, height, health, movie preferences, restaurant preferences, activity level, etc. This list is exemplary only and is not meant to be limiting. In some aspects, AI interface system 100 and/or the client computing device 104 gathers the accessible user data from one or more other computing devices. For example, if the client computing device 104 is a gaming system, a natural user interface may interact with the user 102 and gather all of these modalities as user input. In further aspects, the client computing device 104 may run a plurality of apps, such as one or more email apps, social networking apps, global positioning system (GPS) apps, calendar apps, health monitoring apps, fitness apps, weather apps, etc. Interaction between the user 102 and the various apps operating on the client computing device 104 generate user data associated with the user that contains information in various subjects, which can be collected and analyzed. For example, user data generated by email messages sent and/or received via email apps, social network posts posted and/or read via social network apps, voice recognition of commands, searches submitted via search apps, web sites visited via browser apps, heart rate, physical activity, and caloric intake/burning from health monitoring apps, etc. may be evaluated to identify user context and/or user emotions.

For example, the user context determine by the AI interface system 100 may include the user environment. The user environment as used herein is information about the current environment of the user. For example, the user environment may include the GPS location of a user, the current time of day, the current weather, etc. For example, client computing devices often have GPS location systems, clocks, and weather applications that may be utilized to determine the GPS location of a user, time of day, and the weather for the given GPS location for the user.

Further, in additional aspects, the AI interface system 100 evaluates the user input and/or accessible data to update historical information about the user, such as a historical knowledge graph. The historical information or historical knowledge graph is user specific and created based on collected user data and user inputs. In some aspects, the historical information may also include past determined user emotions and/or user contexts. Further, in some aspects, the user historical information may include past user environments. The historical information may include any past or historical information about the user. For example, the historical information may include historic user contexts such as the user returned from a vacation two weeks ago or bought a new car last month. In another example, the historical information may include emotional trends or history, such as the user often gets angry after a meeting with a certain colleague or historical emotional information, such as the user is often excited when watching sporting events.

Additionally, in some aspects, the AI interface system 100 compares collected user input and/or data to the historical information about the user, such as a historical knowledge graph, to determine a historical context for the user. For example, if the current user input relates to Chinese food, a comparison of this feature to the historical information or knowledge graph determines the historical context that the user loves Chinese food, that Chinese Food makes the user feel happy, and that user ate Chinese food two nights ago at PF Changs.

The AI interface system 100 provides an initial visual representation of the AI interface for interacting with the user for the AI application. The visual representation is a visual personification of the AI interface. For example, the visual representation may include a face for interacting with and engaging the user. In some aspects, the initial visual representation may be a predetermined visual representation provided by the creator of the AI application. In other aspects, the initial visual representation of the AI interface is generated by the AI interface system 100 based on collected user data 106 and/or 110. For example, FIG. 2 illustrates a visual representation of the AI interface for interacting with the user for the AI application. As illustrated by FIG. 2, the visual representation is a visual personification because the green blob includes a face. In some aspects, the visual personification illustrated in FIG. 2 may be representative of an initial visual representation for a child user.

After use of the AI application by the user, the AI interface system 100 generates the AI interface based on collected user inputs, collected user contexts, determined user historical contexts, collected user historical information, collected user emotions, and/or collected user data. In some aspects, the AI interface system 100 generates a three-dimensional visual representation for the AI interface. In further aspects, the AI interface system 100 generates an animated visual representation for the AI interface. In further aspects, the AI interface system 100 generates a visual representation for the AI interface with a selected voice or audio output.

In other aspects, the AI interface system 100 evaluates the collected user inputs, collected user contexts, user historical contexts, user historical information, collected user emotions, and/or collect user data to determine one or more characteristics of the user. A characteristic of a user may include a physical challenge, a mental challenge, emotional challenge, a personality trait, an emotional trait, age, intelligence, custom, nationality, religion, etc. of the user. In some aspects, the AI interface system 100 will try to identify characteristics or personality traits of the user that could use development or improvement. For example, the characteristic may be that the user is shy, hot headed, immature, vain, socially awkward, forgetful, etc. In these aspects, the AI interface system 100 may generate a visual personification of the AI interface that compensates for or empathetically compensates for one or more characteristics of the user. For example, if the user is an eight year old boy who loves dinosaurs and whose favorite color is orange, the AI interface system 100 may generate a green dinosaur as the AI interface as illustrated in FIG. 3. Further, if the eight year boy is autistic and has trouble with eye contact, the AI interface may generate a green dinosaur that looks away from the user while interacting with the autistic eight year old boy user. The AI interface system 100 provides the same generated visual personification of the AI interface to the user until the AI interface system 100 receives instructions to adjust or evolve the visual representation of the AI interface from the AI interface adjustment system 109 and/or the AI interface evolution system 108.

Once the AI interface system 100 has determined a user context, a user emotion and/or the historical user context based on one or more recent user inputs, the AI interface adjustment system 109 collects the user context, user emotion and/or the user historical user context. The term "current" as utilized herein refers to the most recently collected or determined data or to data that was determined or collected within a predetermined time period or event, such as 1 hour, 30 minutes, morning, work meeting, etc. The AI interface adjustment system 109 compares the user context, user emotion and/or the user historical user context to an adjustment threshold. In some aspects, the adjustment threshold includes an environmental threshold, a contextual threshold, a historical threshold, and/or an emotional threshold. In some embodiments, the adjustment threshold is a weighted combination of contextual information, emotional information, environmental information and/or historical information/contexts. However, any suitable threshold for determining that an adjustment to the generated personification of the AI interface would be appropriate for the user based on the determined user context, user emotion, and/or user historical context may be utilized by the AI interface adjustment system 109. If the AI interface adjustment system 109 determines that the adjustment threshold has not been met, the AI interface adjustment system 109 provides the previously generated visual personification of the AI interface to the AI interface system 100 for interacting with a user.

If the AI interface adjustment system 109 determines that the adjustment threshold has been reached, the AI interface adjustment system 109 sends instruction to the AI interface system 100 to adjust the visual personification of the AI interface. An adjustment of the AI interface as utilized herein refers to utilizing the previously generated personification of the AI interface as the starting point or a base and then adjusting one or more attributes of the previously generated personification of the AI interface. The attributes may include the emotion, clothes, coloring, mannerism, activity, animation, shape, voice, behavior, etc. of the generated personification of the AI interface.

For example, if the user is a computer engineer by day and a punk rocker by night, the AI interface adjustment system 109 may send instructions to change the clothes of the generated personification of the AI interface to business casual clothes instead of the normal punk rock clothes based on the current context of at work for the user (meeting an environment/context threshold). In some aspects, the AI interface adjustment system 109 sends adjustments to help compensate for one or more characteristics of the user as well. For example, if the user is an autistic eight year old boy that is agitated, the AI interface adjustment system 109 may send instructions to change the voice, behavior, and mannerisms of the generated personification of the AI interface to a soothing and comforting tone and mannerism to help calm the user.

Once the AI interface system 100 has determined a user context, a user emotion and/or the historical user context, the AI interface evolution system 108 collects the user context, user emotion and/or the user historical user context/historical information and these determination to previously determined user contexts, user emotions, and/or user historical contexts to form compiled user contexts, compiled user emotions, and/or compiled user historical contexts/historical information. The AI interface evolution system 108 compares the compiled user contexts, the compiled user emotions and/or the user historical information/historical user contexts to an evolution threshold. In some aspects, the evolution threshold includes a contextual threshold (which may include an environmental threshold), a historical threshold, and/or an emotional threshold. In some embodiments, the evolution threshold is a weighted combination of contextual information, emotional information, environmental informational and/or historical information. However, any suitable threshold for determining that an evolution in the visual personification of the AI interface would be appropriate for the user based on the compiled user contexts, user emotions, and/or user historical information may be utilized by the AI interface evolution system 108. If the AI interface evolution system 108 determines that the evolution threshold has not been met, the AI interface system 100 provides the previously generated visual personification of AI interface to the user for interacting with AI application.

If the AI interface evolution system 108 determines that the evolution threshold has been met, the AI interface evolution system 108 sends instructions to the AI interface system 100 to evolve or modify the visual personification of the AI interface. The modification of the visual personification may be based on the compiled user contexts, the compiled user emotions and/or the user historical information/historical user contexts that met the evolution threshold. For example, the generated visual personification of the green dinosaur as illustrated in FIG. 3 may have evolved from the visual personification of the blob illustrated in FIG. 2 for the eight year old boy who likes dinosaurs as discussed above.

In some aspects, the AI interface evolution system 108 provides incremental changes in the visual personification of the AI interface, so the changes in the visual personification in AI interface is not readily apparent to the user. For example, if the user is an eight year old child that likes dinosaurs, as the child ages and matures, the dinosaur may slowly convert into a more human like form until the visual personification is a kid and no longer dinosaur. In some aspects, the AI interface evolution system 108 will determine one or more new characteristics of the user and send these characteristics to the AI interface system 100. In further aspects, the AI interface evolution system 108 will determine one or more new characteristics of the user and send these characteristics to the AI interface system 100 in response to determining that the evolution threshold has been met. The interface system may utilize these new user characteristics to evolve the visual personification of the AI interface.

In other embodiments, the AI interface evolution system 108 may send instructions to provide a noticeable change or evolution in the visual personification of the AI voice, so the change in the AI voice readily reflects or responds to a sudden and/or drastic change in the user. For example, if a user context is that the user was in an accident that altered the mental capabilities of the user, an evolution threshold may be met by this context and the AI interface evolution system 108 may send instructions to evolve the visual personification of the AI interface significantly based on this change to the user. Once the personification of the AI interface has been evolved, the modified or evolved personification of the AI interface is provided to user or the client computing device 104 for providing to the user. In some aspects, the evolved personification of the AI interface may be adjusted based on instructions from the AI interface adjustment system 109. For example, the evolved visual personification may need to be adjusted to happy or sad given the current user context and emotion as determined by the AI interface adjustment system 109.

In some aspects, the AI interface system 100 utilizes a learning algorithm to determine the user context, the historical user context, the user emotion, and/or the user characteristics. In some aspects, the AI interface system 100 utilizes a learning algorithm to generate, adjust, and/or evolve the visual personification of the AI interface. Any learning algorithm referred to herein may include machine learning, deep learning, and/or statistical modeling techniques.

In some aspects, the AI interface system 100 collects user feedback from user inputs to train or updated the learning algorithms. As such, the AI interface system 100 may continually improve with use by the user 102. The feedback may be explicit or implicit. For example, explicit user feedback is when the user selects or provides input that indicates that he or she likes a provided visual personification of the AI interface. In contrast, implicit feedback is determined by monitoring user behavior and emotion in response to a provided visual personification of an AI interface. For example, collecting a sad user input in response to a change in clothes by the visual representation of the AI interface may indicate negative feedback for the adjusted visual personification of the AI interface.

In some aspects, the AI interface system 100 utilizes the current user input, any other user inputs in the same thread, and/or other collected user data to determine the user context, user historical context, user emotion, and/or user characteristics. In some aspects, the AI interface system 100 utilizes the current user input, any other user inputs in the same thread, and/or other collected user data to generate, adjust, and/or evolve the visual personification of the AI interface. Any known method for determining user context, user historical context, user emotions, and/or user characteristics for collected user inputs and/or user data may be utilized by the AI interface system 100.

In some aspects the user 102 of the AI system 100 is a plurality of individuals or a group of individuals. In these aspects, the user data and/or information is collected from each individual's client computing devices, applications, digital activity, etc. as discussed above. In these aspects, the visual personification of the AI interface may adjust and/or evolve based on the group. In further aspects, the visual personification of the AI interface may adjust and/or evolve based on the individual from the group that is interacting with the visual personification of the AI interface. In additional aspects, the visual personification of the AI interface may adjust and/or evolve based on the group and the individual from the group that is interacting with the visual personification of the AI interface.

Figure 4:
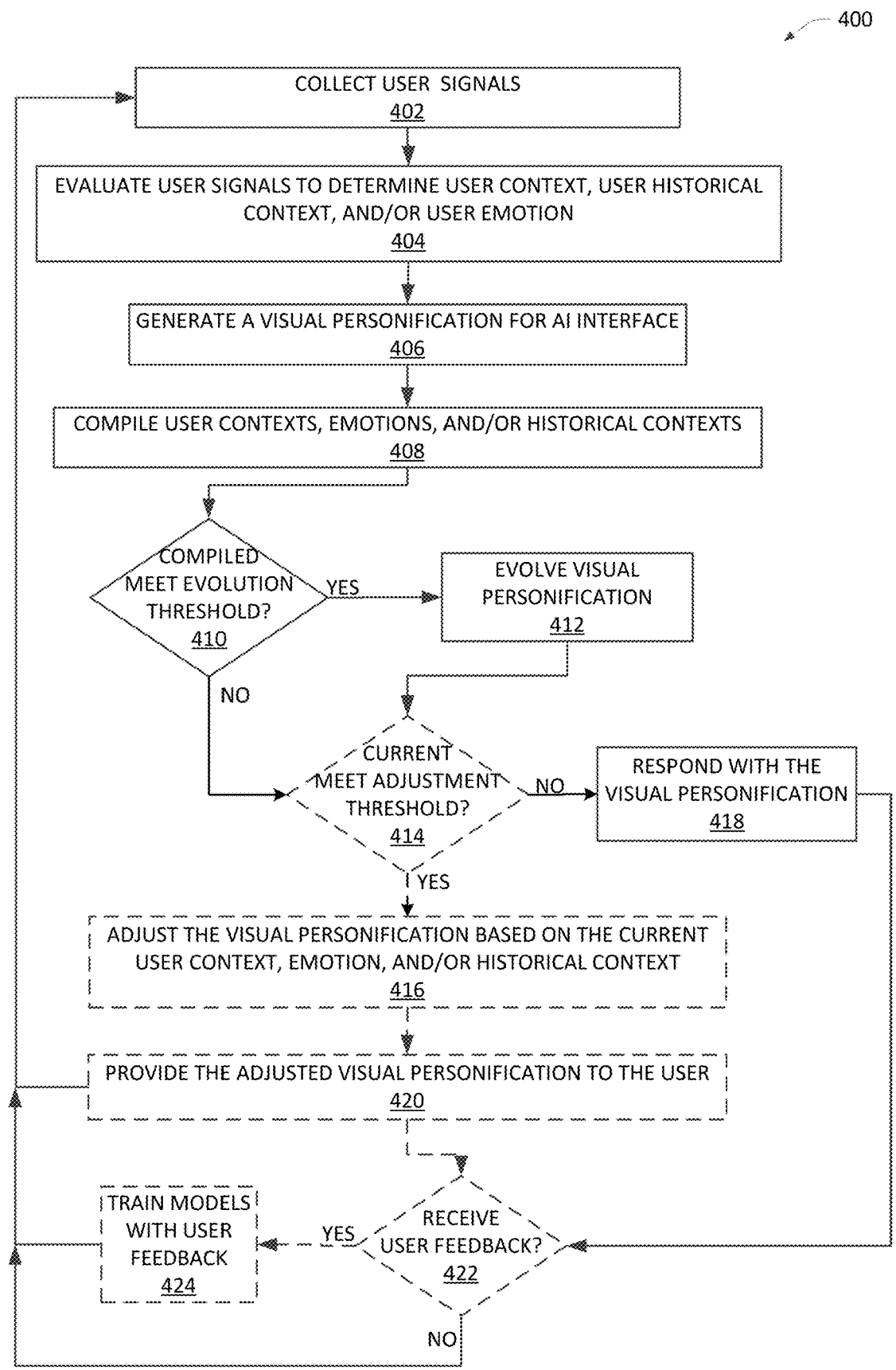
FIG. 4 is a flow diagram illustrating a method for generating, adjusting and/or evolving a visual representation of an AI interface for an AI application, in accordance with aspects of the disclosure.

FIG. 4 is a flow diagram conceptually illustrating an example of a method 400 for generating, adjusting, and/or evolving a visual representation of an AI interface for an AI application. In some aspects, method 400 is performed by the AI interface system 100 as described above. Method 400 provides a method 400 that generates, adjusts, and/or evolves a visual personification of an AI interface based on the user to increase engagement, trust, and/or emotional connection with the user without requiring any AI interface setting changes by the user when compared to previously utilized AI interfaces for AI applications.

Method 400 includes operation 402. At operation 402, user signals are collected. The user signals may include accessible user data and/or user inputs for the AI application. In some aspects, the user input is a spoken language input. In other aspects, the user input is a text, video, image, or other modal form of user input. In further aspects, the user input is received via a client computing device at operation 402. For example, the client computing device may receive an image input via a camera on the client computing device.

The accessible user data may include data about the user stored on a current client computing device or user data accessed over a network from another computing device or application, such as user's search history, calendar, background, etc. In some aspects, the accessible user data includes collecting historical data about the user. For example, the user accessible data may be collected from a server computing device, a client computing device, a web browser, a calendaring application, a database, etc.

Method 400 includes operation 404. At operation 404, the collected user input is evaluated, alone or in combination with the collected user data, to determine a user context, a user emotion, and/or a user historical context. The user historical context may be determined by comparing the user input and/or user data to historical information, such as a user historical knowledge graph, to determine a user historical context. In some aspects, the user context includes a user environment.

Method 400 also includes operation 406. At operation 406, a visual personification for the AI interface is generated. In some aspects, the visual personification for the AI interface is generated based on the collected user input, collected user data, and/or the evaluation information. In further aspects, the collected user input, collected user data, and/or the evaluation information is analyzed to determine one or more characteristics of the user at operation 406. In these aspects, the visual personification for the AI interface is generated to compensate for or empathetically compensate for the one or more determined user characteristics at operation 406.

At operation 408, the currently determined context(s), emotion(s), and historical context(s) of the user are compiled and added to previously determined and collected context(s), emotion(s), and historical context(s) to form compiled contexts, compiled emotions, and/or compiled historical contexts of the user at operation 408. In some aspects the compiled information is provided and/or stored a user specific knowledge graph.

Next, the compiled contexts, emotions, and/or historical contexts of the user are compared to an evolution threshold at operation 410. If one or more of the compiled contexts, compiled emotions, and/or compiled historical contexts of the user are determined to meet or exceed the evolution threshold based on the comparison at operation 410, then operation 412 is performed. In none of the compiled contexts, compiled emotions, and/or compiled historical contexts of the user are determined to meet or exceed the evolution threshold based on the comparison at operation 410, then operation 414 or operation 420 is performed. In some aspects, the evaluation threshold comprises a predetermined amount of change between the current context, emotion, and historical context and the previously compiled user context, emotions, and/or historical contexts.

Method 400 includes operation 412. At operation 412, the visual personification of the AI interface generated at operation 406 is evolved or modified to form an evolved visual personification of the AI interface. In some aspects, the visual personification is evolved at operation 412 based on the compiled contexts, emotions, and/or historical contexts of the user that meet or exceed the evolution threshold. In other aspects, the compiled contexts, compiled emotions, and/or compiled historical contexts of the user are analyzed or evaluated to determine one or more characteristics of the user at operation 412. In these aspects, the visual personification is evolved at operation 412 based on the one or more user characteristics. In some aspects, the visual personification of the AI interface is evolved to compensate for the one or more user characteristics at operation 412.

In some aspects, the evolution at operation 412 is an incremental change to the visual personification that may not be readily noticeable by the user. In other aspects, a noticeable change to the visual personification is provided at operation 412 to readily reflect or respond to sudden and/or significant changes to the characteristics of the user.

In some aspects, method 400 includes operation 414. At operation 414, a determination is made whether or not to adjust the visual personification of the AI interface for the AI application. In some aspects, at operation 414, the evaluation information, such as the user context (including the user environment), user emotion, and/or the user historical data determined at operation 404 based on recently received user signals, is compared to an adjustment threshold. If the evaluation information does not meet the adjustment threshold based on the comparison at operation 414, operation 418 is performed. If the evaluation information meets the adjustment threshold based on the comparison at operation 414, operation 416 is performed.

At operation 418, the generated visual personification of AI interface is provided to the user by the client computing device. As such, the visual personification of the AI interface provided at operation 418 is the same as the previously provided AI interface or is the evolved AI interface generated at operation 412.

In some aspects, method 400 includes operations 416 and 420. At operation 416, the generated or evolved visual personification of the AI interface is adjusted to form an adjusted visual personification of the AI interface. At operation 416 the visual representation of the AI interface is adjusted by modifying one or more attributes of the visual personification of the AI interface based on the evaluation information, such as the user context, user environment, user emotion, and/or the user historical data to form the adjusted visual personification of the AI interface. As discussed above, the attributes may include the emotion, clothes, coloring, mannerism, activity, animation, shape, voice, behavior, etc. of the generated personification of the AI interface.

After operation 416, the adjusted visual personification of the AI interface is provided to the user at operation 420. As discussed above, the client computing device provides the adjusted visual personification of the AI interface to the user.

In some aspects, method 400 includes operations 422 and 424. At operation 422 the user signals collected at operation 402 are analyzed to determine if any user feedback was provided. If no user feedback was provided as determined at operation 422, method 400 then performs operation 402. In some aspects, if user feedback is determined at operation 422, operation 424 is performed. At operation 424 the learning algorithm is trained or updated based on the determined user feedback.

In some aspects, the operations of method 400 do not have to be performed in the order provided as would be understood by a person of skill in the art. For example, some operations may be performed simultaneously or at overlapping times. Additionally, method 400 may continuously or sporadically perform operation 402.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
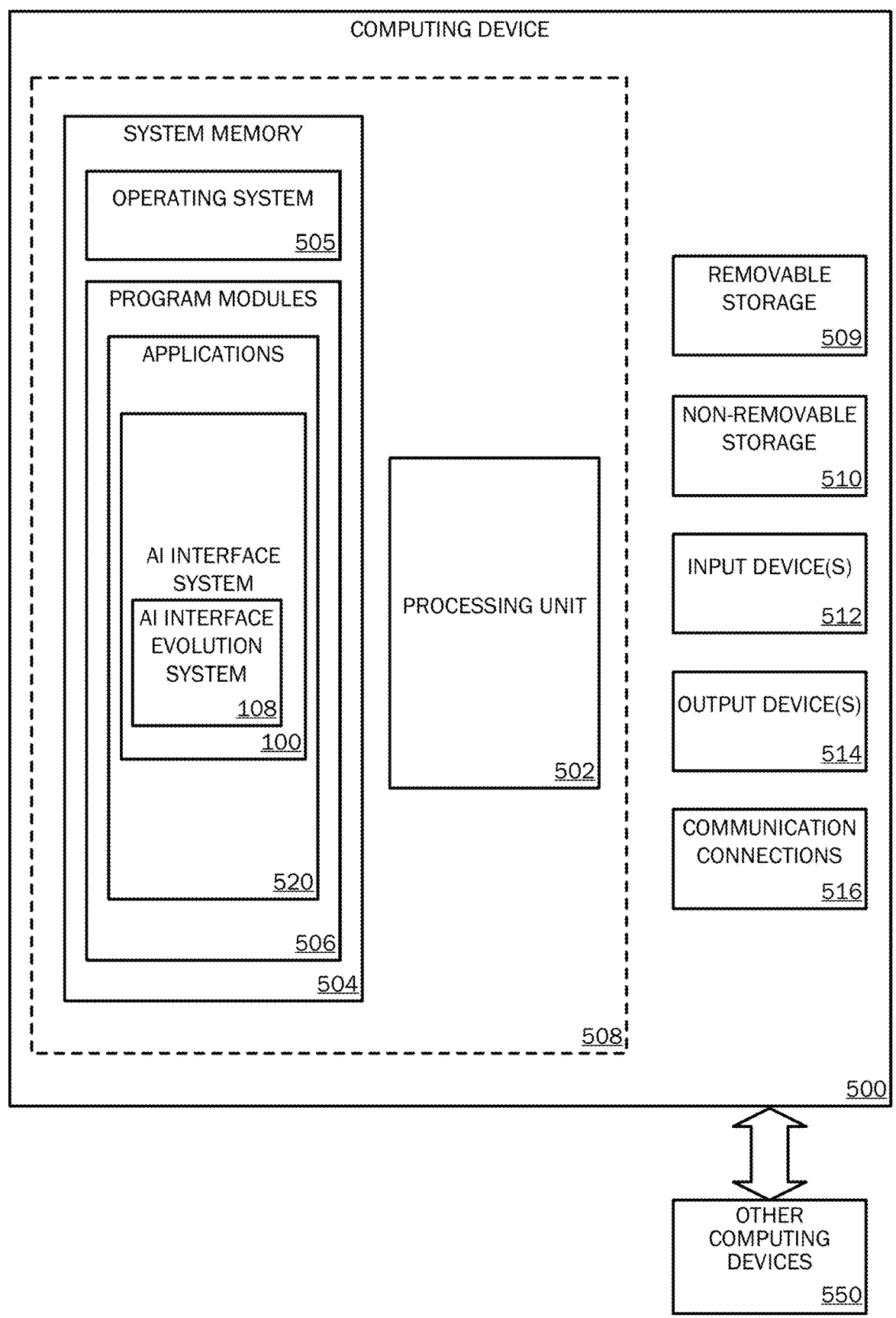
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the AI interface system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, an augmented reality device, a virtual reality device, smart speakers, and/or etc. The computing device components described below may include computer executable instructions for the AI interface system 100 that can be executed to employ method 400 generate an evolved or modified AI voice as disclosed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510. For example, user data, user contexts, user emotions, user environments, and/or user historical data of the AI interface system 100 could be stored on any of the illustrated storage devices.

As stated above, a number of program modules and data files may be stored in the system memory 504. While executing on the processing unit 502, the program modules 506 (e.g., the AI interface system 100, AI interface evolution system 108, and/or AI interface adjustment system 109) may perform processes including, but not limited to, performing method 400 as described herein. For example, the processing unit 502 may implement the AI interface system 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc. In some aspect, the AI interface system 100 allows a user to interact with one or more of the above referenced applications through spoken language inputs and/or spoken language outputs.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or spoken language input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
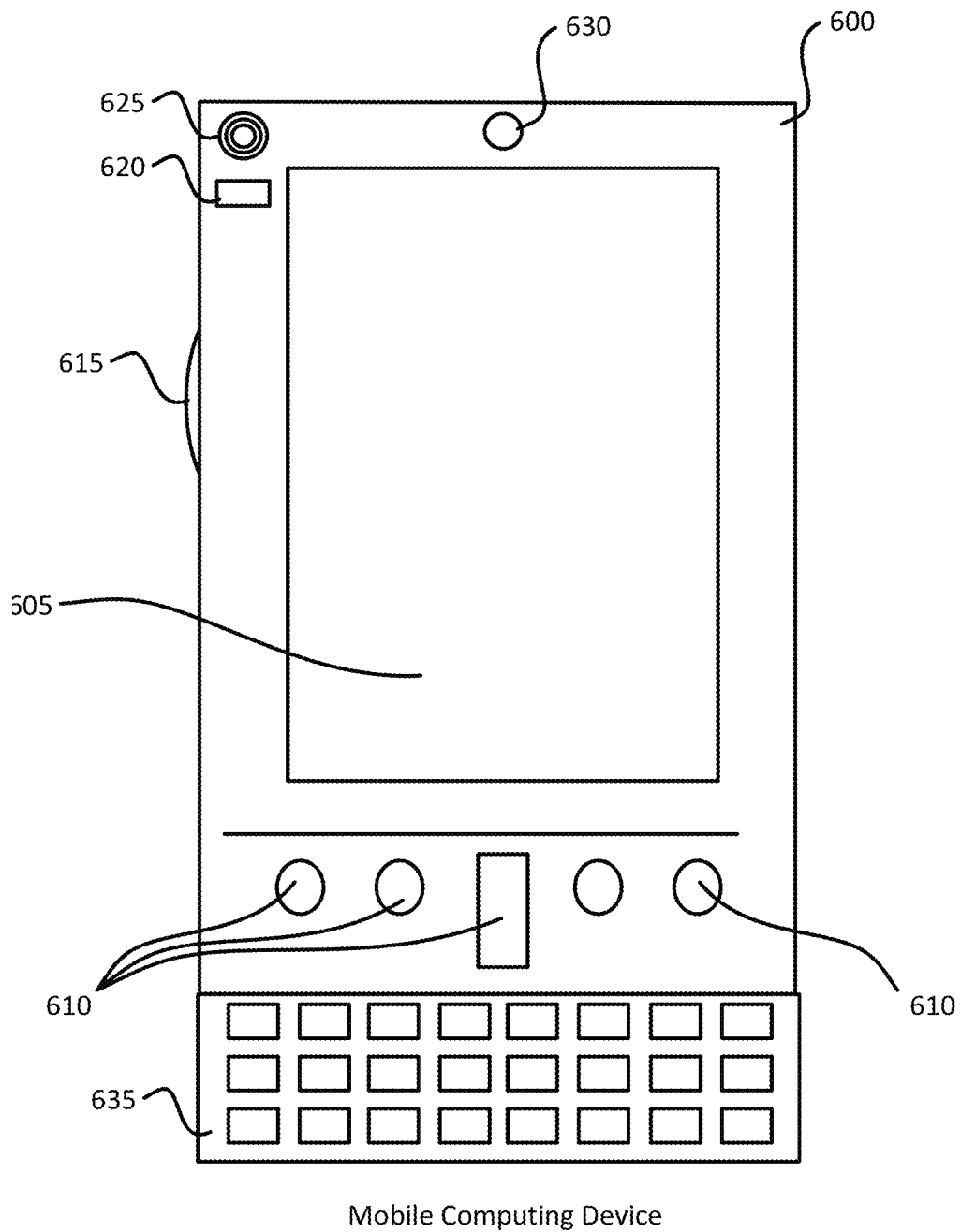
FIG. 6A is a simplified block diagram of a mobile computing device with which various aspects of the disclosure may be practiced.
Figure 6B:
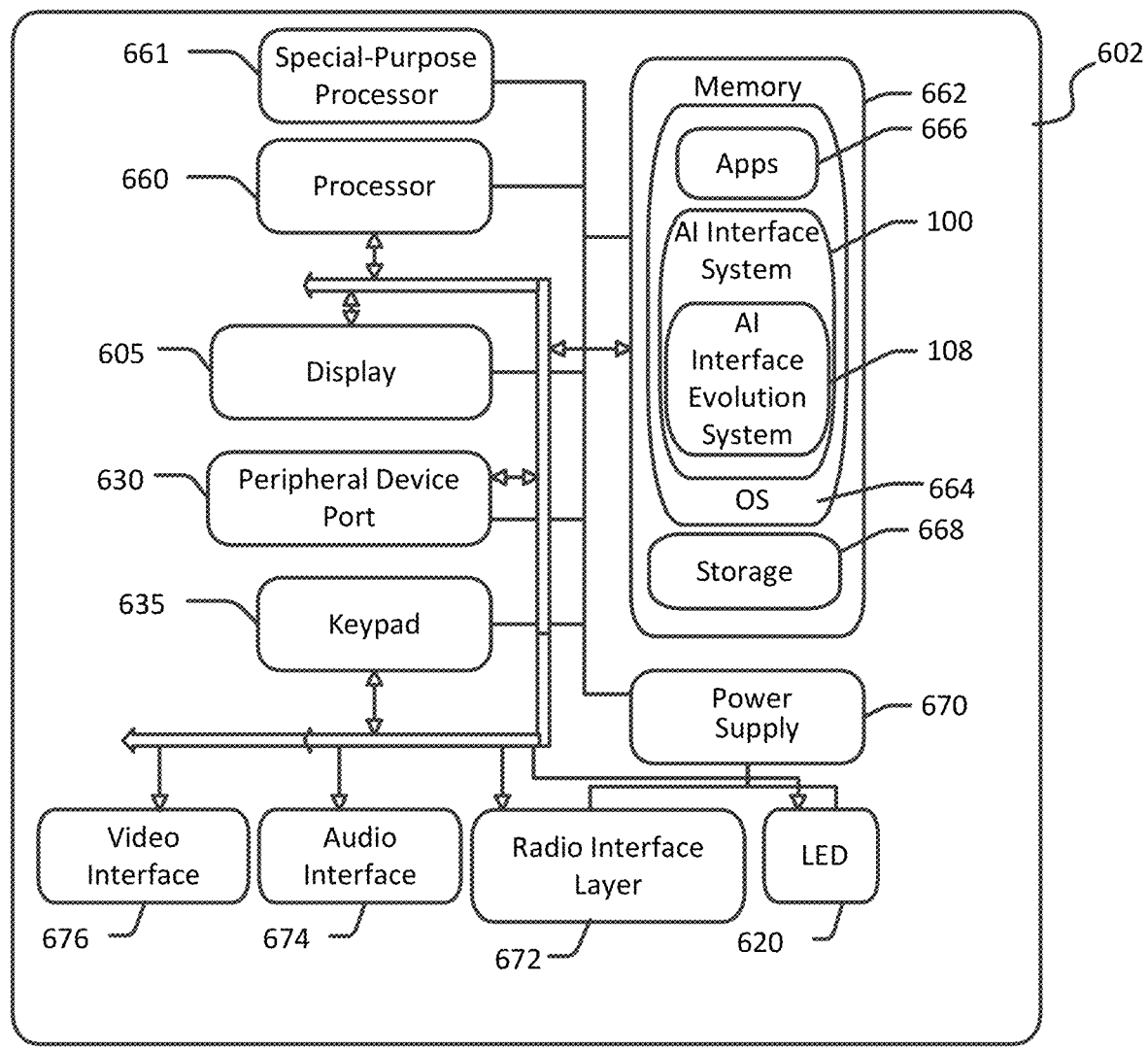
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, an augmented reality device, a virtual reality system, smart speakers, or the like, with which aspects of the disclosure may be practiced. With reference to FIG. 6A, one aspect of a mobile computing device 600 suitable for implementing the aspects is illustrated. In a basic configuration, the mobile computing device 600 is a hand-held computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 and/or the AI interface system 100 run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
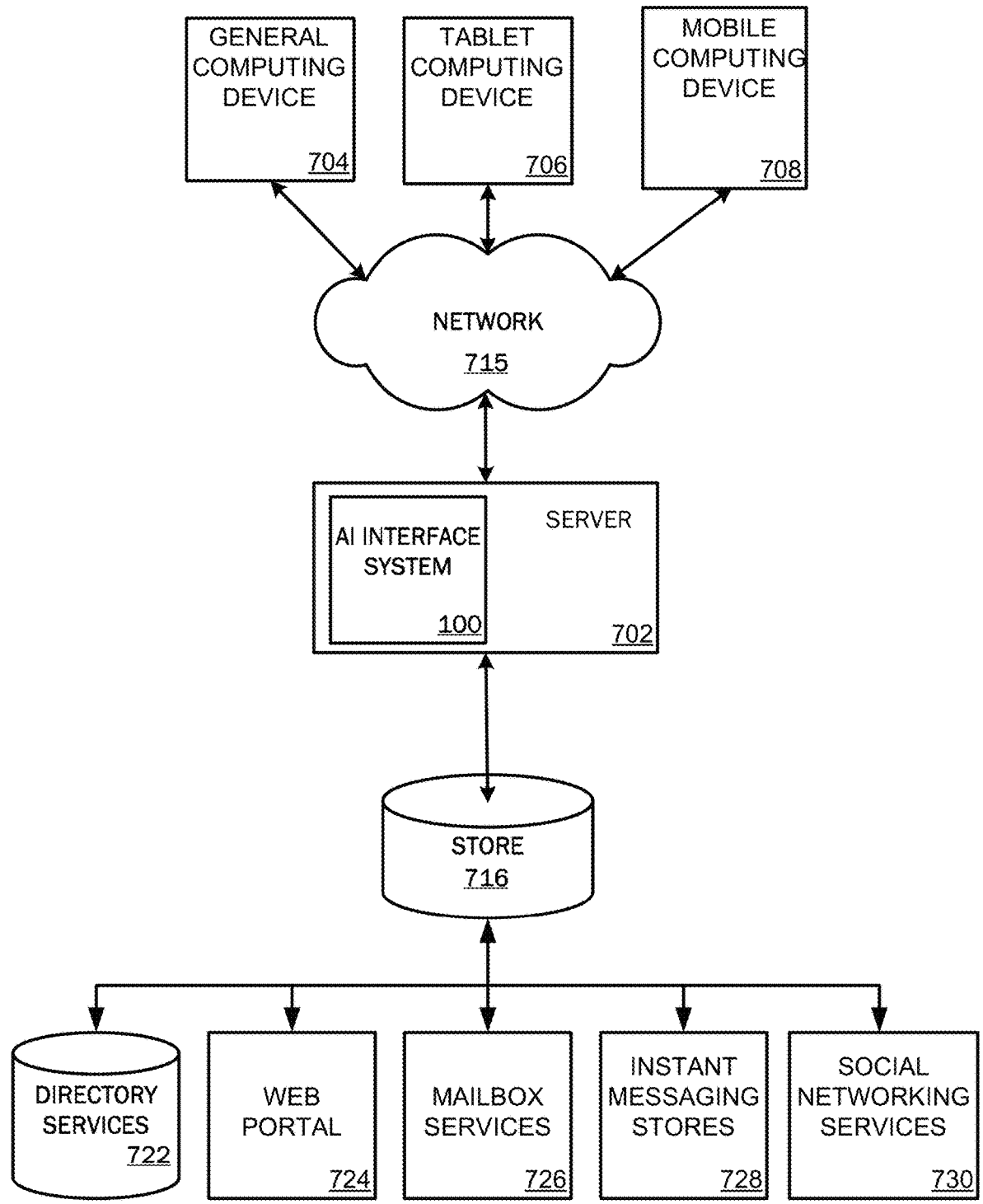
FIG. 7 is a simplified block diagram of a distributed computing system in which various aspects of the disclosure may be practiced.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the AI interface system 100 may be implemented in a general computing device 704 (e.g. a gaming system, a virtual reality system, a desktop computer, or other smart non-mobile device), a tablet computing device 706 and/or a mobile computing device 708 (e.g., a smart phone, a smart watch, or other smart mobile devices). In some aspects, the server 702 is configured to implement an AI interface system 100, via the network 715 as illustrated in FIG. 7.

Figure 8:
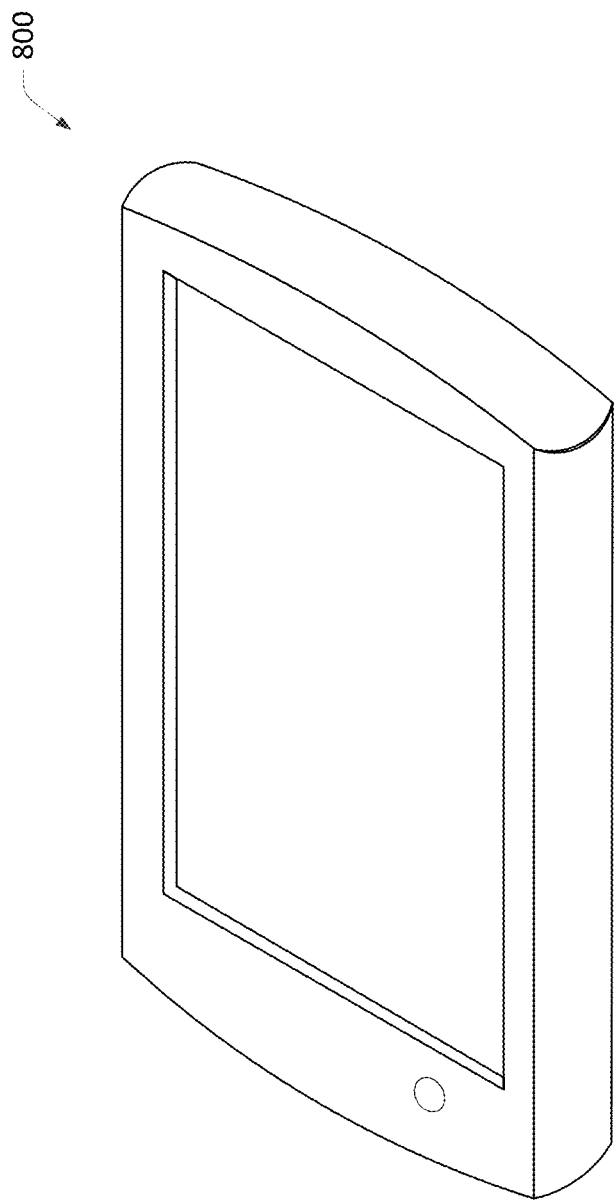
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific embodiments disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various embodiments disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for an evolved visual representation of an artificial intelligence (AI) interface, the system comprising:
   at least one processor; and
   a memory for storing and encoding computer executable instructions that, when executed by the at least one processor is operative to:
      receive first user signals from one or more devices associated with a user;
      evaluate the first user signals to determine a current context of the user;
      compare the current context of the user to a past context of the user;
      determine an evolution of the user has occurred based upon the comparison of the current context to the past context; and
      in response to the determination that the evolution has occurred, replace a past visual personification of the AI interface for the user with a current visual personification of the AI interface for the user, wherein the past visual personification is used as a base and is incrementally built upon in order to evolve the past visual personification into the current visual personification.

2. The system of claim 1, wherein the at least one processor is operative to:
   receive second user signals from the one or more devices associated with the user;
   evaluate the second user signals to determine another context of the user;
   analyze the another context of the user;

determine whether an adjustment of the user has occurred based upon the analysis of the another context of the user;
adjust the current visual personification of the AI interface in response to a determination that the adjustment of the user has occurred to form an adjusted current visual personification of the AI interface; and
provide the adjusted current visual personification of the AI interface to the user for interacting with the user in response to formation of the adjusted current visual personification of the AI interface.

3. The system of claim 1, wherein the at least one processor is operative to:
receive second user signals from the one or more devices associated with the user;
evaluate the second user signals to determine another context;
analyze the another context of the user;
determine whether an adjustment of the user has occurred based upon the analysis of the another context of the user; and
provide the current visual personification to the of the AI interface to the user for interacting with the user in response to a determination that the adjustment of the user has not occurred.

4. The system of claim 1, wherein the first user signals of the user are personality traits of the user.

5. The system of claim 1, wherein before the evolution has occurred, the at least one processor is operative to:
compare the first user signals to a historical knowledge graph for the user to determine a first historical context of the user;
determine if an adjustment of the user has occurred based upon the first historical context,
wherein the past visual personification of the AI interface is adjusted based on the first historical context; and
update the historical knowledge graph for the user based on the first user signals.

6. The system of claim 1, wherein the user is a single user of the AI interface, and the first user signals includes signals from the single user.

7. The system of claim 1, wherein the user includes a plurality of users of the AI interface, and the first user signals includes signals from the plurality of users.

8. The system of claim 1, wherein the current visual personification compensates for one or more current characteristics of the user, wherein the one or more current characteristics includes an emotional challenge.

9. The system of claim 1, wherein the current visual personification compensates for one or more current characteristics of the user, wherein the one or more current characteristics includes a mental or physical challenge.

10. The system of claim 1, further comprising adjusting the current visual personification, wherein to adjust the current visual personification of the AI interface is performed utilizing machine learning.

11. The system of claim 1, wherein the current visual personification of the AI interface is adjusted based on the at least one of the current context.

12. The system of claim 1, wherein the past visual personification of the AI interface and the current visual personification of the AI interface are three-dimensional.

13. The system of claim 12, wherein the current visual personification of the AI interface differs from the past visual personification of the AI interface by an incremental visual change.

14. A method for evolved visual representation of an artificial intelligence (AI) interface, the method comprising:
receiving user signals from one or more devices associated with a user of an AI application including the AI interface;
evaluating the user signals to determine contexts of the user;
compiling the contexts of the user to form compiled user contexts;
comparing a current user context of the compiled user contexts to a past user context of the compiled user contexts;
determining an evolution of the user has occurred based upon the comparison of the current user context to the past user context; and
in response to determining that the evolution has occurred, replace a past visual personification of the AI interface for the user with a current visual personification of the AI interface for the user, wherein the past visual personification is used as a base and is incrementally built upon in order to evolve the past visual personification into the current visual personification.

15. The method of claim 14, wherein before the evolution of the user has occurred, the method further comprising:
determining whether an adjustment of the user has occurred based upon at least one of a first context, a first emotion, or a first historical context;
adjusting the past visual personification of the AI interface in response to the determination that the adjustment has occurred to form a first adjusted past visual personification of the AI interface; and
providing the adjusted past visual personification of the AI interface to the user for interacting with the user in response to formation of the adjusted past visual personification of the AI interface.

16. The method of claim 15, further comprising:
determining whether another adjustment of the user has occurred based upon at least one of a second context, a second emotion, or a second historical context;
adjusting the past visual personification of the AI interface in response to the determination that the another adjustment has occurred to form a second adjusted past visual personification of the AI interface; and
providing the second adjusted past visual personification of the AI interface to the user for interacting with the user in response to formation of the second adjusted past visual personification of the AI interface.

17. The method of claim 15, further comprising:
determining whether another adjustment of the user has occurred based upon a second context, a second emotion, or a second historical context; and
providing the first adjusted past visual personification of the AI interface to the user for interacting with the user in response to the determination that the another adjustment has not occurred by any of the second context, the second emotion, or the second historical context.

18. The method of claim 15, further comprising:
determining one or more first characteristics of the user based on collected user signals;
wherein the past visual personification of the AI interface compensates for the one or more first characteristics of the user,
in response to determining that the evolution has occurred, determining one or more second characteristics of the user based on the compiled user contexts, wherein the current visual personification of the AI interface compensates for the one or more second characteristics of the user, and wherein the past visual personification of the AI interface and the current visual personification of the AI interface are three-dimensional.

19. A system for an evolved visual representation of an artificial intelligence (AI) interface, the system comprising:
   at least one processor; and
   a memory for storing and encoding computer executable instructions that, when executed by the at least one processor is operative to:
      receive current user signals from one or more devices associated with a user;
      evaluate the current user signals to determine at least one of a current context of the user and a current emotion of the user;
      determine that an adjustment of the user has not occurred based upon at least one of the current context and the current emotion;
      provide a first visual personification of the AI interface to the user for interacting with the user in response to a determination that the adjustment of the user has not occurred;
      compare compiled user contexts and compiled user emotions for the user;
      determine an evolution of the user has occurred based upon the comparison of the compiled user contexts or the compiled user emotions; and
      in response to the determination that the evolution has occurred, replace the first visual personification of the AI interface for the user with a second visual personification of the AI interface for the user, wherein the first visual personification is used as a base and is incrementally built upon in order to evolve the first visual personification into the second visual personification.

* * * * *